United States Patent

Harato et al.

[11] Patent Number: 5,833,865
[45] Date of Patent: Nov. 10, 1998

[54] SEDIMENTATION TYPE SOLID-LIQUID SEPARATOR

[75] Inventors: Takuo Harato, Niihama; Yoshio Kumagae, Yokohama; Kazuhisa Ishibashi, Minoo, all of Japan

[73] Assignee: Sumitomo Chemical Company, Limited, Osaka, Japan

[21] Appl. No.: 819,203

[22] Filed: Mar. 17, 1997

Related U.S. Application Data

[63] Continuation of Ser. No. 510,337, Aug. 2, 1995, abandoned, which is a continuation-in-part of Ser. No. 260,975, Jun. 15, 1994, abandoned.

[30] Foreign Application Priority Data

Jun. 16, 1993 [JP] Japan .................................. 5-144684

[51] Int. Cl.⁶ .......................... B01D 21/01; B01D 21/24
[52] U.S. Cl. .......................... 210/733; 210/801; 210/803; 210/519; 210/207
[58] Field of Search ........................ 210/205, 207, 210/208, 519, 528, 532.1, 534, 540, 729, 733, 734, 738, 801, 803

[56] References Cited

U.S. PATENT DOCUMENTS

| | | | |
|---|---|---|---|
| 1,102,463 | 7/1914 | Wyckoff | 210/519 |
| 1,741,187 | 12/1929 | Fuqua | 210/519 |
| 2,267,516 | 12/1941 | Adams | 210/527 |
| 3,224,593 | 12/1965 | Nebolsine | 210/519 |
| 3,353,676 | 11/1967 | Hirsch | 210/519 |
| 3,523,889 | 8/1970 | Eis | 210/519 |
| 3,672,511 | 6/1972 | Watson et al. | 210/519 |
| 4,074,786 | 2/1978 | Potter et al. | 210/519 |
| 4,274,958 | 6/1981 | Fitch | 210/519 |
| 4,406,789 | 9/1983 | Bryson | 210/519 |
| 4,678,585 | 7/1987 | Brownrigg | 210/734 |
| 5,080,803 | 1/1992 | Bagatto et al. | 210/803 |

FOREIGN PATENT DOCUMENTS

| | | |
|---|---|---|
| 530304 | 12/1921 | France . |
| 2578238 | 5/1986 | France . |
| 304387 | 11/1972 | Germany . |
| 58-174209 | 10/1993 | Japan . |
| 925993 | 5/1963 | United Kingdom . |

OTHER PUBLICATIONS

Chemical Engineering Handbook, ISBN 4–621–03231–3 C3058, 1988, pp. 742–749.

*Primary Examiner*—Christopher Upton
*Attorney, Agent, or Firm*—Birch, Stewart, Kolasch & Birch, LLP

[57] ABSTRACT

The slurry subjected to aggregation processing by a line mixer is supplied to a slurry feed member via a slurry supply passage and then fed radially outward from slurry fed outlets within a sedimentation tank. Therefore, liquid flow hardly takes place below the slurry feed member and the settling velocity of the solid is increased. The slurry feed member is arranged close to the boundary face of the thickened slurry zone, and thus the settling distance of the solid is shortened. Accordingly, the residence time of the solid is shortened to a great extent. In addition, the sedimentation tank can be constructed to be sealed and solid-liquid separation can be also performed under the pressurized state.

12 Claims, 7 Drawing Sheets

SEDIMENTATION TYPE SOLID-LIQUID SEPARATOR

This application is a continuation of application Ser. No. 08/510,337 filed on Aug. 2, 1995, now abandoned; which was a continuation-in-part, of application Ser. No. 08/260,975 filed on Jun. 15, 1994.

BACKGROUND OF THE INVENTION

1. Field of the Invention

The present invention relates to a sedimentation type solid-liquid separator which is arranged to perform solid-liquid separation by utilizing the gravity of solid (solid particles) in slurry, thus to obtain clarified liquid and thickened slurry, and more particularly, to a sedimentation type solid-liquid separator which has rapid sedimentation ability capable of down-sizing the separator and increasing the production efficiency of the separator.

2. Description of the Prior Art

Conventionally, there is well known a sedimentation type solid-liquid separator which separates slurry in which the solid and liquid are mixed without dissolution, into clarified liquid substantially free from solid and thickened slurry having higher solid content by utilizing the gravity of solid (solid particles) in slurry. This sedimentation type solid-liquid separator is generally called a thickener, noting that thickened slurry is obtained thereby or a clarifier, noting that clarified liquid is obtained thereby. In addition, a sedimentation type solid-liquid separator in which slurry or liquid is subjected to aggregation processing is generally called a flocculator.

And generally, such a sedimentation type solid-liquid separator is classified into the non-contact type solid-liquid separator and the contact type solid-liquid separator.

Here, the non-contact type solid-liquid separator is such a type of separator in which flocs (solid) are sequentially monotonously settled and are deposited on the bottom of the separator, and specifically, an upward-flow type thickener (clarifier) as shown in FIG. 4 or a horizontal-flow type flocculator as shown in FIG. 5 is well known conventionally.

As shown in FIG. 4, an upward-flow type thickener 100 is substantially composed of a sedimentation tank 101, a feed-well 102 and a peripheral gutter 103, wherein slurry is supplied onto the upper portion of the feed-well 102. Here, in the sedimentation tank 101, a clear liquid zone 104 composed of clarified liquid, a settling zone 105 wherein solid is settling and a thickened slurry zone 106 wherein solid is deposited are formed from above in turn. And clear liquid flows out from the peripheral gutter 103, while thickened slurry is drawn out from the bottom of the sedimentation tank 101. In addition, the sedimentation tank 101 is provided with a mud collecting device 107 for collecting slurry deposited on the bottom of the tank.

On the other hand, as shown in FIG. 5, in the horizontal-flow type flocculator 110, after liquid or slurry is subjected to aggregation processing in two aggregation chambers 111, 112, it is separated into sludge and clarified liquid in a sedimentation chamber 113, so that clarified liquid is discharged via a clear liquid chamber 114, while sludge (thickened slurry) is discharged via a sludge discharge groove 115. In addition, the sedimentation chamber 113 is provided with a sludge collecting device 116 for collecting sludge deposited on the bottom of the chamber into the sludge discharge groove 115.

Meanwhile, the contact type solid-liquid separator is such a type of separator in which flocs of small diameter newly supplied or generated are caught by flocs of larger diameter already formed through contact or mixing therewith so as to be enlarged and increased in settling performance. And specifically, a slurry-blanket type flocculator as shown in FIG. 6, a slurry circulation type flocculator as shown in FIG. 7 or an external circulation type flocculator (for example, Japanese Patent Laid-Open Publication No. 174209/1983) as shown in FIG. 8 is known conventionally.

As shown in FIG. 6, in the slurry-blanket type flocculator 120, after liquid or slurry is subjected to aggregation processing in a rapid agitation chamber 121, it is fed to a slow agitation chamber 122 and then the sludge in the slow agitation chamber 122 is fed to a sedimentation chamber 124 as indicated by arrows $Y_1$. Here in the sedimentation chamber 124, a clear liquid zone 125 is formed in the upper portion and a sludge zone 126 (thickened slurry zone) is formed in the lower portion, and the sludge fed to the sedimentation chamber 124 reaches the clear liquid zone 125 through the sludge zone 126. At this time, flocs of small diameter in the sludge are caught by flocs of larger diameter in the sludge zone 126. And the clarified liquid is discharged via a gutter 127, while the sludge is discharged from the bottom of the sedimentation chamber 124.

As shown in FIG. 7, in the slurry circulation type flocculator 130, after liquid is subjected to aggregation processing in the primary agitation chamber 131, it is fed to the secondary agitation chamber 132, and part of the slurry in the secondary agitation chamber 132 is returned to the primary agitation chamber 131 via the circulation chamber 134 as indicated by an arrow $Y_2$. Here in the primary agitation chamber 131, newly generated flocs of small diameter are mixed with circulated flocs of larger diameter so as to be caught thereby, so that flocs are enlarged and the settling performance is improved. And part of the slurry in the second agitation chamber 132 is fed to the sedimentation chamber 133 as indicated by an arrow $Y_3$ for solid-liquid separation, and the clarified liquid is discharged via the gutter 135 and sludge is discharged from the bottom of the sedimentation chamber 133.

Further, as shown in FIG. 8, in the external circulation type flocculator 140, after liquid is subjected to aggregation processing in the feed supply tube 141 by using an agitator 142, it is fed to a sedimentation chamber 143. In the sedimentation chamber 143, a clear liquid zone 144, a aggregated floc zone 145 and a thickened sludge zone 146 (thickened slurry zone) are formed from above in turn, clarified liquid is discharged via an overflow gutter 147 and thickened sludge is drawn out from the bottom of the sedimentation chamber 143. Here, part of the thickened sludge is returned to the feed supply tube 141 with a returning pump 148, so that newly generated flocs of small diameter are mixed with returned flocs of larger diameter so as to be caught thereby for enlargement of flocs and increase in the settling velocity thereof.

Any of said conventional sedimentation type solid-liquid separators is advantageous in that the construction cost and operation cost are inexpensive and the maintenance is easy as compared with other kinds of solid-liquid separators, for examples, a filter press.

Accordingly, the sedimentation type solid-liquid separator has been conventionally in wide use in a process requiring solid-liquid separation of the manufacturing process in various fields of industries. For example, it is used in the separation of non-soluble residues from sodium aluminate solution or the separation of solidified aluminum hydroxide from sodium aluminate solution in the alumina manufacturing process using bauxite as raw material according to Bayer's process.

In the conventional well-known sedimentation type solid-liquid separator, for example, in the upward-flow type thickener 100 as shown in FIG. 4, the solid in the feed-well 102 takes a long time to reach the thickened slurry zone 106 through settling within the settling zone 105, so that the residence time of the solid becomes long. Although a method wherein the feed-well 102 is disposed at a lower position to lower the supply position of slurry and to reduce the time required for settling of the solid may seem apparently possible, with such an arrangement, the thickened slurry zone 106 is disturbed by slurry flow blown downward from the feedwell 102, resulting a disadvantage that the flocs in the thickened slurry zone 106 are floated upward.

Also in the horizontal-flow type flocculator 110 as shown in FIG. 5, there has been such a problem that it takes a long time for the solid in the sedimentation chamber 113 to settle and the compression or thickening of the thickened slurry layer deposited on the bottom of the sedimentation chamber 113 is insufficient. In addition, a sludge collecting device 116 of a complicated structure is required.

Even in the slurry-blanket type flocculator 120 as shown in FIG. 6, it is required for catching flocs of small diameter to hold a large quantity of solid in the sludge zone 126, and therefore, the residence time of the solid becomes long. Further, in the slurry-circulation type flocculator 130 as shown in FIG. 7 or the external-circulation type flocculator 140 as shown in FIG. 8, since the solid is circulated or returned, the residence time of the solid inevitably becomes long.

In such conventional sedimentation type solid-liquid separators, although the formation of flocs of large diameter becomes possible owing to development of a new flocculant and a considerable improvement has been made, there is such a problem that the separation time of the liquid from the slurry becomes considerably long in any of the apparatuses, and the down-sizing of the separator or a higher production efficiency can not be expected resulting in the increase of the facility investment and the operation cost.

SUMMARY OF THE INVENTION

In view of the above-described knowledge or consideration, the present invention has been developed with a view to substantially solving the above-described problems and has as its essential object to provide a sedimentation type solid-liquid separator which makes it possible to separate solid and liquid from each other in a short time, with an excellent separation efficiency and realizes down-sizing of the separator and a high production efficiency.

In order to achieve the above-mentioned object, according to a first aspect of the present invention, there is provided a sedimentation type solid-liquid separator comprising: a sedimentation tank for causing an upward overall flow of the liquid in slurry and on the other hand, for causing a gravitational settling of the solid in slurry; a slurry feed member for feeding slurry supplied through a slurry supply passage substantially in the horizontal direction within said sedimentation tank; a clarified liquid discharge means for discharging clarified liquid from the upper portion of said sedimentation tank; and a thickened slurry discharge means for discharging thickened slurry from the lower portion of said sedimentation tank.

Further, according to a second aspect of the present invention, there is provided a sedimentation type solid-liquid separator, wherein, in the above-mentioned separator according to the first aspect of the present invention, said sedimentation tank is formed with a straight barrel section and an upward-expanding tapered section provided adjacent to the lower end of said straight barrel section, and said slurry feed member is disposed in the vicinity of the boundary face of a thickened slurry zone to be formed in said sedimentation tank.

Further, according to a third aspect of the present invention, there is provided a sedimentation type solid-liquid separator, wherein, in the above-mentioned separator according to the first aspect of the present invention, said sedimentation tank is formed with a straight barrel section and an upward expanding tapered section provided adjacent to the lower end of said straight barrel section, and said slurry feed member is disposed in the vicinity of the boundary face of a thickened slurry zone to be formed in the sedimentation tank, and at a position around the central portion of said sedimentation tank with respect to the horizontal direction, and further, slurry feed outlets of the slurry feed member are opened radially outward (outward from the center) of the sedimentation tank.

Further, according to a fourth aspect of the present invention, there is provided a sedimentation type solid-liquid separator, wherein, in the above-mentioned separator according to the first aspect of the present invention, said sedimentation tank is formed with a straight barrel section and an upward-expanding tapered section provided adjacent to the lower end of said straight barrel section, and said slurry feed member is disposed in the vicinity of the boundary face of a thickened slurry zone to be formed in the sedimentation tank and at a position near the inner wall of said sedimentation tank with respect to the horizontal direction, and further, slurry feed outlets of said slurry feed member are opened radially inward of the sedimentation tank.

Further, according to a fifth aspect of the present invention, there is provided a sedimentation type solid-liquid separator, wherein, in any one of the first to fourth aspects of the present invention, an aggregation processing means for aggregating slurry by adding a flocculant is provided in an upstream process prior to said slurry supply passage.

Furthermore, according to a sixth aspect of the present invention, there is provided a sedimentation type solid-liquid separator, wherein, in any one of the first to fourth aspects of the present invention, an aggregation processing means for aggregating slurry by adding a flocculant is provided in an upstream process prior to said slurry supply passage, and a slow agitation means for slowly agitating a thickened slurry zone formed on the lower portion of said sedimentation tank is provided within said sedimentation tank.

According to the above-mentioned sedimentation type solid-liquid separator of the present invention, since slurry is fed from the slurry feed member into the sedimentation tank substantially in the horizontal direction, liquid flow hardly takes place below the slurry feed member. Therefore, the solid (solid particles) in slurry is settled in a state close to the free settling and thus the time required for the settling is shortened. Accordingly, the residence time of the solid is reduced to a great extent and the downsizing of the separator becomes possible.

In addition, when the slurry feed member is disposed near the boundary face of the thickened slurry zone, the time required for the settling of the solid is further shortened.

Therefore, the residence time of the solid is securely shortened, and the downsizing of the separator becomes possible.

Furthermore, in addition to the above construction, when an aggregation processing means for aggregating slurry by adding a flocculant is provided and the aggregation processing means is provided in an upstream process prior to the slurry supply passage, since the aggregation processing means is provided outside the solid-liquid separator, the solid-liquid separator can be made compact.

Furthermore, in addition to the above construction, when a slow agitation means for slowly agitating a thickened slurry zone formed on the lower portion of the sedimentation tank is provided within the sedimentation tank, since the aggregation processing means is provided outside the solid-liquid separator, there is an advantage that the solid-liquid separator can be made compact, and the liquid removal effect of the thickened slurry layer is increased and the solid-liquid separator can be made further compact.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Hereinafter, the apparatuses according to the present invention will be described with reference to the accompanying drawings, but the following examples are some embodiments of the present invention and not intended to limit other apparatuses of the present invention.

Firstly, a sedimentation type solid-liquid separator (hereinafter, referred to as a thickener) of normal pressure specification is described with reference to FIG. 1.

Figure 1:
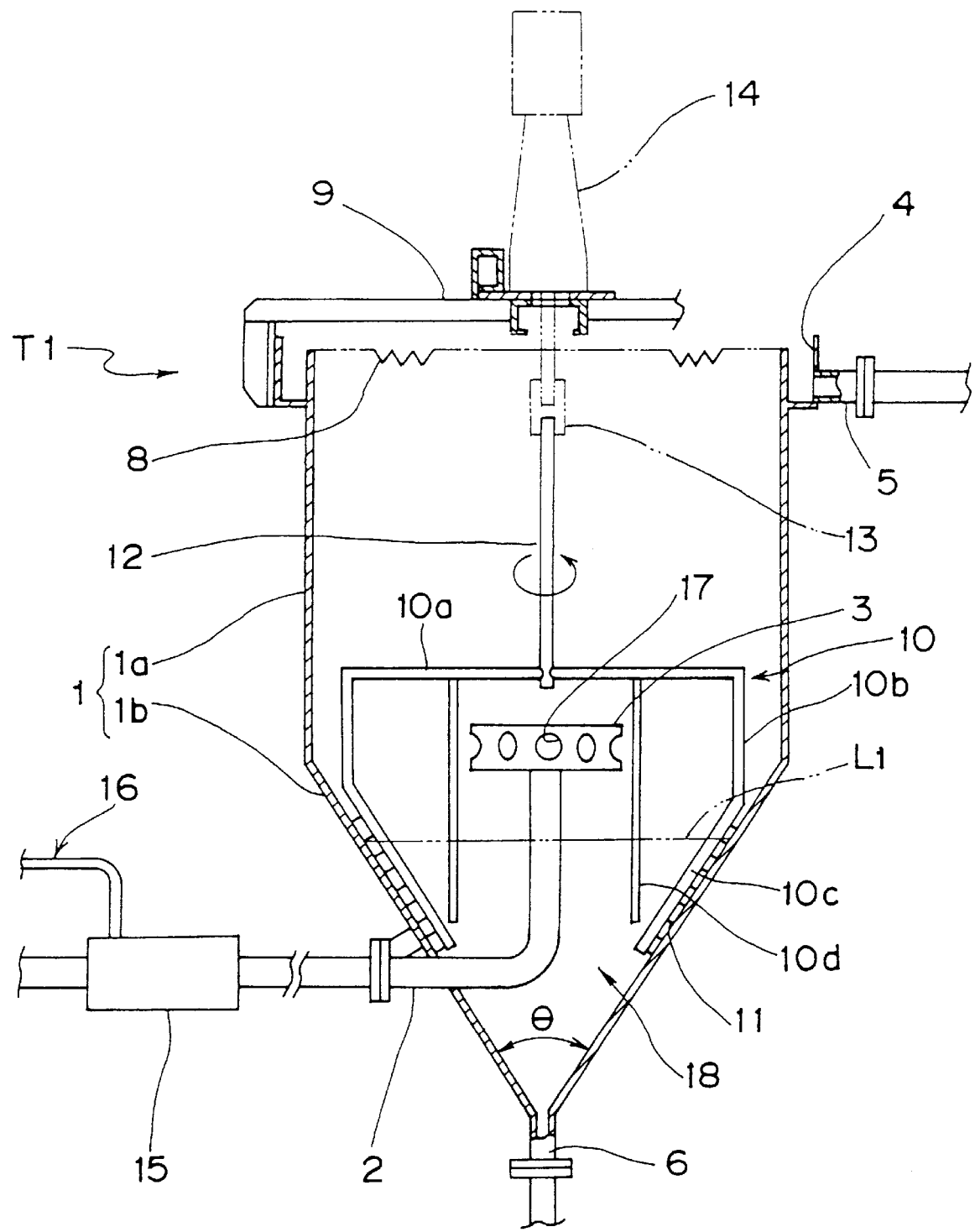
FIG. 1 is a partly broken explanatory elevation view of a thickener of normal pressure specification according to the present invention.

As shown in FIG. 1, a thickener T1 of normal pressure specification is basically so constructed that slurry supplied via a slurry supply passage 2 and a slurry feed member 3 is separated, within a sedimentation tank 1, into clarified liquid and thickened slurry by utilizing the gravity of the non-soluble solid (hereinafter, simply referred to as the solid) in slurry, and the clarified liquid is discharged outside via an over-flow gutter 4 and a clarified liquid discharge passage 5, while the thickened slurry is discharged outside via a thickened slurry discharge passage 6. Herein, the thickener T1 falls under the above-mentioned "sedimentation type solid-liquid separator". Furthermore, the assembled body composed of the over-flow gutter 4 and the clarified liquid discharge passage 5 falls under the above-mentioned "clarified liquid discharge means", and the thickened slurry discharge passage 6 falls under the above-mentioned "thickened slurry discharge means".

The main body of the sedimentation tank 1 is composed of a cylindrical straight barrel section 1a and an upward-expanding hollow conical tapered section 1b adjacent to the lower end portion of the straight barrel section 1a. It is to be noted here that although an upward-expanding tapered section 1b adjacent to the lower portion of the straight barrel section 1a is shown to be in a hollow conical shape, its shape is not limited to such a conical shape but it may be, for example, in a bottom-rounded shape, namely, in a shell cover shape. Here, the upper end of the straight barrel section 1a open to the atmosphere, while the lower end portion of the tapered section 1b is closed to the atmosphere and connected to the thickened slurry discharge passage 6.

On the outer periphery surface near the upper end of the straight barrel section 1a, an overflow gutter 4 for receiving overflow from the sedimentation tank 1 is provided. Furthermore, on the upper end of the straight barrel section 1a, a notch 8 (V-shaped cut-off) for causing overflow of clarified liquid is provided. In addition, a bridge member 9 bridging over the sedimentation tank 1 (straight barrel section 1a) radially is provided with the end portions being fixed to the outer periphery of the overflow gutter 4.

Inside the sedimentation tank 1, there is provided a rake 10, which is composed of a lateral frame member 10a extending radially in the straight barrel section 1a, longitudinal frame members 10b provided on both ends of the lateral frame member 10a so as to extend downward, slant frame members 10c provided on both lower ends of the longitudinal frame members 10b so as to extend substantially along the inner peripheral face of the tapered section 1b and a plurality of blades 11 provided on the slant frame members 10c. The rake 10 falls under the above-mentioned "slow agitation means".

In the present invention, the slow agitation means performs liquid removal from the thickened slurry with slant frame members 10c and so on, besides the primary effect of sludge collection with blades 11, so as to expedite the thickening of slurry in the thickened slurry layer. In addition, in order to efficiently expedite the liquid removal in the thickened slurry zone, besides the slant frame members 10c, members for shearing the thickened slurry layer longitudinally or laterally, for example, longitudinal frame members 10d may be provided so as to extend downward from the intermediate portion between both ends and central portion of the lateral frame member 10a, thus to slowly agitate thickened slurry for formation of a liquid removal passage in thickened slurry.

In the present invention, the expression "slow agitation" means such agitation that solid included in the thickened slurry cannot be floated upward thereby.

In order to avoid hindered settling with the slurry feed member 3 through the slurry supply passage 2, the lateral frame member 10a is disposed above the slurry feed member 3, and the longitudinal frame members 10b are disposed on the periphery side away from the outer periphery of the slurry feed member 3. The rake 10 is connected to a motor 14 via a rotating shaft 12 and a connecting member 13 and slowly rotated by the motor 14.

When the rake 10 is rotated, the thickened slurry zone 18 formed on bottom portion of the sedimentation tank 1 is slowly agitated, and thereby, the sludge collection effect onto the bottom portion of the sedimentation tank and the liquid removal degree of the thickened slurry zone 18 are expedited together, and the degree of thickening is raised.

After entering into the sedimentation tank 1 by radially passing through the wall surface of the tapered section 1b while extending in the horizontal direction, the slurry supply passage 2 is bent upward and upward extends in the vicinity of the axial center of the sedimentation tank 1 so as to be connected to the slurry feed member 3 at its upper end.

And outside the sedimentation tank 1, a flocculant supply tube 16 for supplying a specified flocculant is connected to the slurry supply passage 2. The flocculant supply tube 16 for supplying the flocculant to the slurry supply passage 2 is acceptable it is constructed so that the flocculant is uniformly mixed into slurry, and flocs of large particle size can be formed during the travel of slurry up to the slurry feed member 3. In FIG. 1, a line mixer 15 (static mixer)is provided in the slurry supply passage 2 and the flocculant supply tube 16 is connected to this line mixer 15. Since the aggregation processing, namely, formation of flocs is performed outside the thickener T1 as described above, the thickener T1 becomes compact in construction. In addition, the assembly body composed of the slurry supply passage 2 and the flocculant supply tube 16 falls under the above-mentioned "aggregation processing means".

The slurry feed member 3 is normally disposed in the vicinity of the axial line of the sedimentation tank 1 and in the range from below the central portion of the straight barrel section to the central portion of the hollow conical tapered section.

In the case of aiming to obtain clarified liquid superior in clarity, the slurry feed member 3 is disposed on the lower portion of the sedimentation tank 1, namely, near the central portion of the hollow conical tapered section 1b so that the residence time of liquid in the clarified layer becomes long. On the other hand, when it is intended to obtain thickened slurry superior in the extent of thickening, the slurry feed member 3 is disposed on the upper portion of the solid-liquid separation tank 1, namely, near the central portion of the straight barrel section 1a so that the residence time of the thickened slurry in the thickened slurry zone becomes long.

In the design of the sedimentation tank 1, unless the installation position of the slurry feed member 3 is made to be movable, namely, when the installation position is fixed, the position of the slurry feed member 3 may be determined in accordance with the object desired.

In applying the sedimentation tank, it is indispensable that the operation thereof should be conducted so that the boundary face $L_1$ of the thickened slurry zone is positioned below and comparatively close to the slurry feed member 3.

In other words, in the present invention, the slurry feed member 3 is disposed at a position a little above the boundary face $L_1$ of the thickened slurry zone and comparatively close thereto.

The positional control for the boundary face $L_1$ is performed by a method wherein the discharge speed for the thickened slurry is increased or decreased in accordance with the deviation of the position of the boundary face detected by a sensor (not shown) to the target value so as to hold the boundary face $L_1$ at a specified position (target value).

The slurry feed member 3 may be basically constructed so as to feed slurry substantially horizontally with respect to radial direction of the sedimentation tank 1, and the slurry supply passage within the sedimentation tank 1 may be introduced from the upper portion or the lower portion of the sedimentation tank 1 so as to communicate to the slurry feed member 3, but in FIG. 1, the slurry feed member 3 is a hollow cylindrical column, and is arranged with the axial line being oriented vertically, namely, with the peripheral surface being confronted with the inner peripheral surface of the straight barrel section 1a. And the slurry feed member 3 is communicated with the slurry supply passage 2 at its lower end face. On the peripheral surface of the slurry feed member 3, there are provided a plurality of slurry feed outlets 17, each of which are opened radially outward. With such a construction, slurry in the slurry feed member 3 is fed radially outward of the sedimentation tank 1, namely, fed in a radial shape and in the horizontal direction.

In the above-described construction, the slurry subjected to aggregation processing by the flocculant supplied into the slurry supply passage 2 from the flocculant supply tube 16 is supplied to the slurry feed member 3 through the slurry supply passage 2 and thereafter fed within the sedimentation tank 1 from the slurry feed outlets 17.

Here, since the slurry in the slurry feed outlet 17 is fed radially and horizontally, in the region in which a solid content of the slurry is equal to or less than a solid content of the slurry to be fed thereto (a solid content of the slurry in the slurry feed member 3), namely in the settling zone above the boundary face $L_1$ of the thickened slurry zone 18, within the sedimentation tank 1, liquid flow hardly takes place below the slurry feed member 3. Therefore, the solid in slurry introduced into the sedimentation tank 1 from the slurry feed member 3 has substantially no hindered settling zone and settles in a state like the free settling, and therefore, the settling velocity of the solid becomes very fast. Further, as described above, since the slurry feed member 3 is close to the boundary face $L_1$ of the thickened slurry zone 18, the solid reaches the boundary face $L_1$ of the thickened slurry zone 18 in a very short time. Thus, the residence time of the solid within the sedimentation tank 1 becomes very short. Furthermore, since liquid flow hardly takes place below the slurry feed member 3, there is an advantage that the thickened slurry zone 18 is not disturbed despite the positional arrangement of the slurry feed member close to the boundary face $L_1$, of the thickened slurry zone 18.

Figure 4:
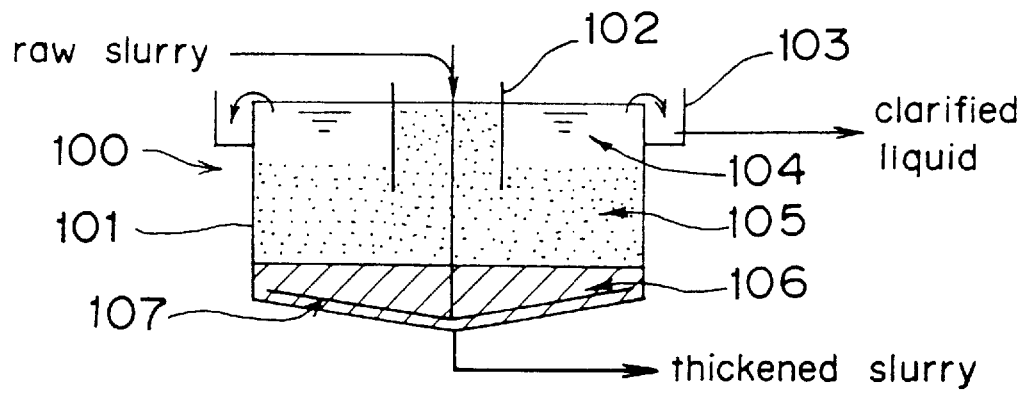
FIG. 4 is a schematic diagram of a conventional upward-flow type thickener.
Figure 5:
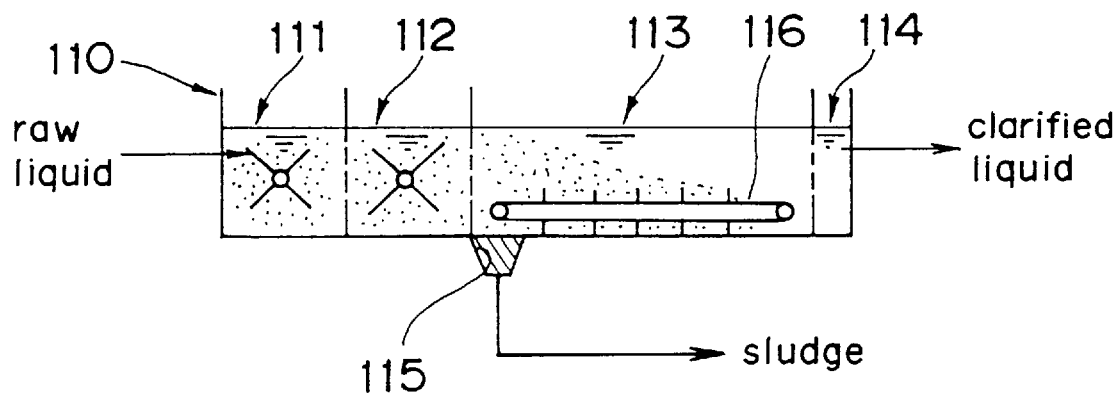
FIG. 5 is a schematic diagram of a conventional horizontal type flocculator.
Figure 6:
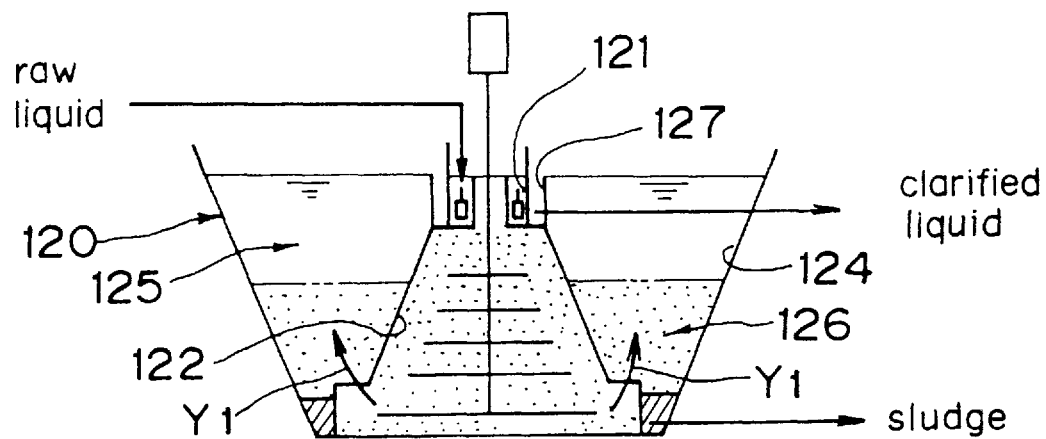
FIG. 6 is a schematic diagram of a conventional slurry-blanket type flocculator.
Figure 7:
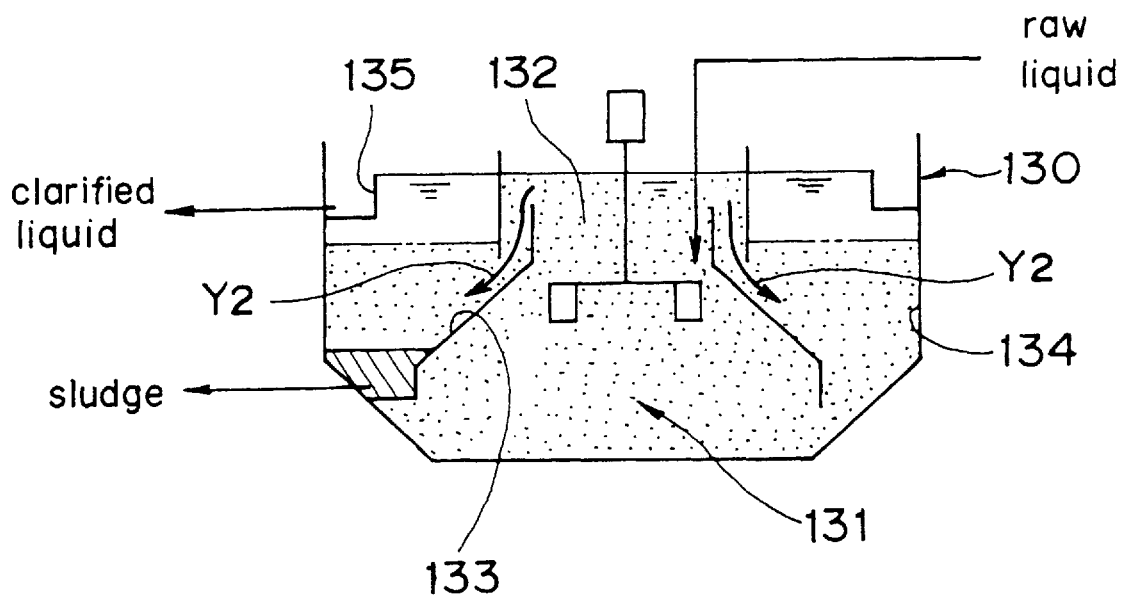
FIG. 7 is a schematic diagram of a conventional slurry-circulation type flocculator.
Figure 8:
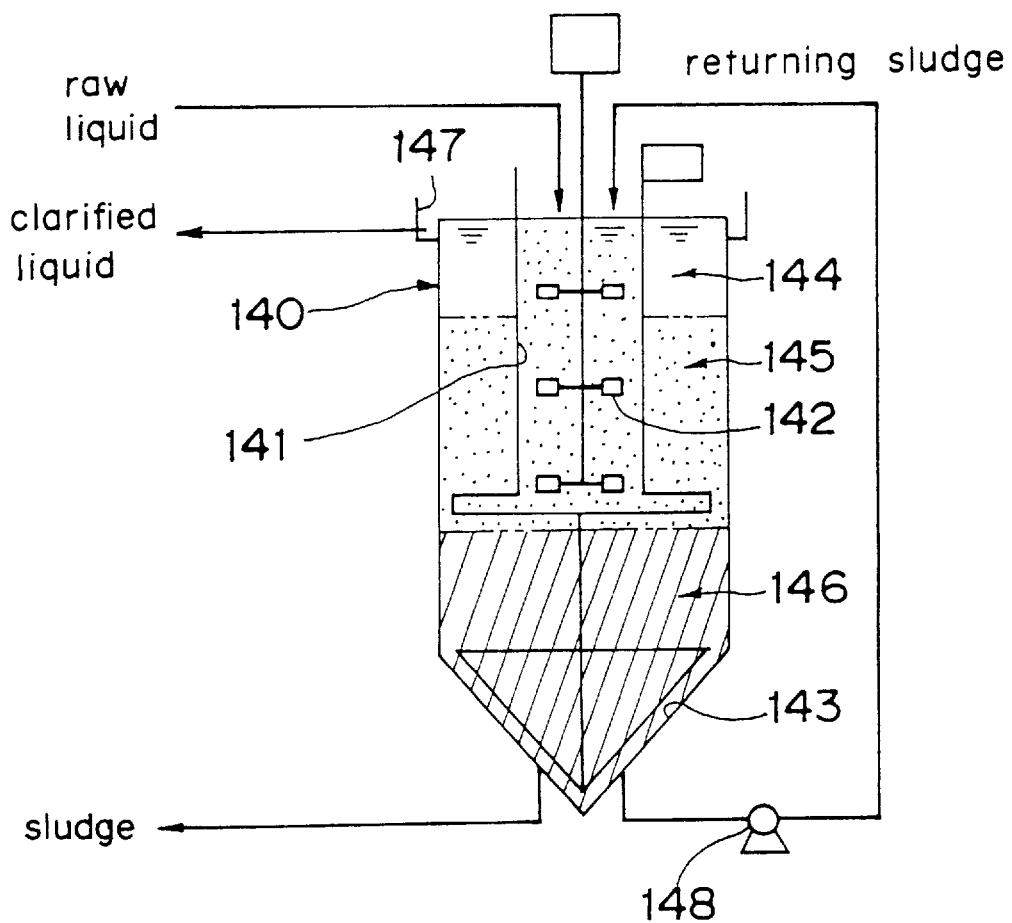
FIG. 8 is a schematic diagram of a conventional external-circulation type flocculator.

The greatest technical difference of the separator of the present invention from a conventional sedimentation type solid-liquid separator, for example, an upward-flow type thickener with a feed-well as shown in FIG. 4 lies in the feed method and feed position of slurry into the sedimentation tank 1.

In a conventional separator as shown in FIG. 4, the slurry supplied into the feed-well is essentially fed downward, although some devices are provided therein. The flocs (solid) in the fed slurry is settled by gravity in the first place and then spread as described later. On the other hand, although liquid once falls down in a mixed-phase flow with the flocs, it changes its flow direction in a horizontal flow and then in an upward flow, and is discharged from the upper portion of the tank. Therefore, when slurry is supplied continuously, the settling flocs form a laterally spread flow through joining and interference with liquid flowing horizontally and upwardly.

And since the density of supplied slurry is larger than that of the liquid phase and smaller than that of the thickened slurry zone, the supplied slurry is spread all over the upper surface of the thickened slurry zone within the tank and is separated while performing hindered setting.

In contrast with the above, in the case of the horizontal feed by the separator of the present invention, flocs are settled downward by gravity, while the direction of liquid flow is changed from the horizontal to the upwardness as a whole flow namely a uniform flow, and therefore, flocs settle at the free settling velocity without meeting with the upward flow of liquid, namely, without passing the interference zone and the separation speed becomes very rapid.

In addition, with the arrangement of substantially horizontal feed, even when the slurry supply outlet is arranged in the vicinity of the thickened slurry zone, windup of thickened slurry by the feed takes place little and therefore, the positions of the thickened slurry zone 18 and the slurry feed member 3 can be made close to each other. As a result, the settling distance of flocs can be shortened and the separation time can be further shortened.

Here, since the thickened slurry zone 18 as shown in FIG. 1 is formed within the tapered section 1$b$ having a predetermined apex angle θ, the thickened slurry zone 18 becomes larger in thickness (depth) for its volume and well compressed by its own weight, resulting in a higher degree of the thickening and the liquid removal. Furthermore, since it is slowly agitated by the rake 10, the thickening degree of the thickened slurry zone 18 becomes very high.

Furthermore, although the clarified zone is formed on the upper portion of the sedimentation tank 1, since the settling velocity of the solid is large as described above and thus, the settling velocity becomes superior, the content ratio of solid in the clarified liquid becomes very small. Namely, since thickened slurry of a high thickening ratio is obtained and clarified liquid of a small content ratio of solid is obtained, the solid-liquid separation efficiency of the thickener T1 becomes extremely high.

Figure 9:
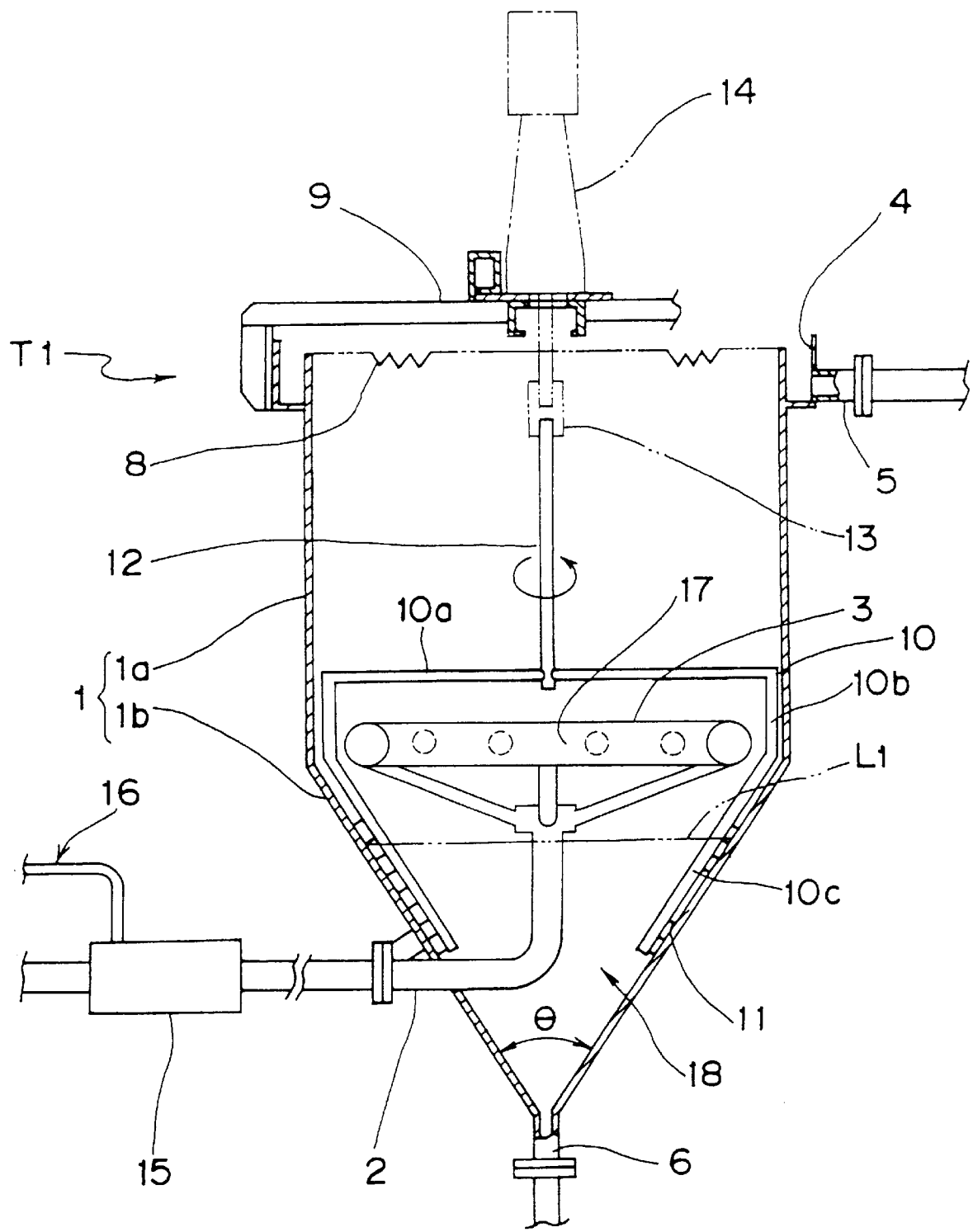
FIG. 9 is a partly broken explanatory elevation view of a thicker of normal pressure according to the fourth aspect of the present invention.

In an example shown in FIG. 1, although a slurry feed member 3 in which the feed direction is radially outward is provided, for example, a ring-shaped slurry feed member wherein the feed direction is radially inward may be provided a little above and comparatively close to the boundary face $L_1$, of the thickened slurry zone 18 as shown in FIG. 9.

When the feed direction of the slurry is radially outward or inward, the rotary motion of the slurry fed from the slurry feed member 3 is restrained. Therefore the feed direction is very important factor to perform an effective solid-liquid separation.

The expression in the present invention "substantially in the horizontal direction" for the slurry feed angle from the slurry feed member 3 denotes such a range of direction that settling solid performs free settling without substantially forming a hindered settling zone. According to the experimentation result of the inventor of the present invention, if the feed direction is in the range from the perfectly horizontal direction with respect to the boundary face $L_1$ to about 30° upward or downward, preferably to about 15° upward or downward, more preferably to about 10° upward or downward, the above-described requirement is satisfied.

Figure 2:
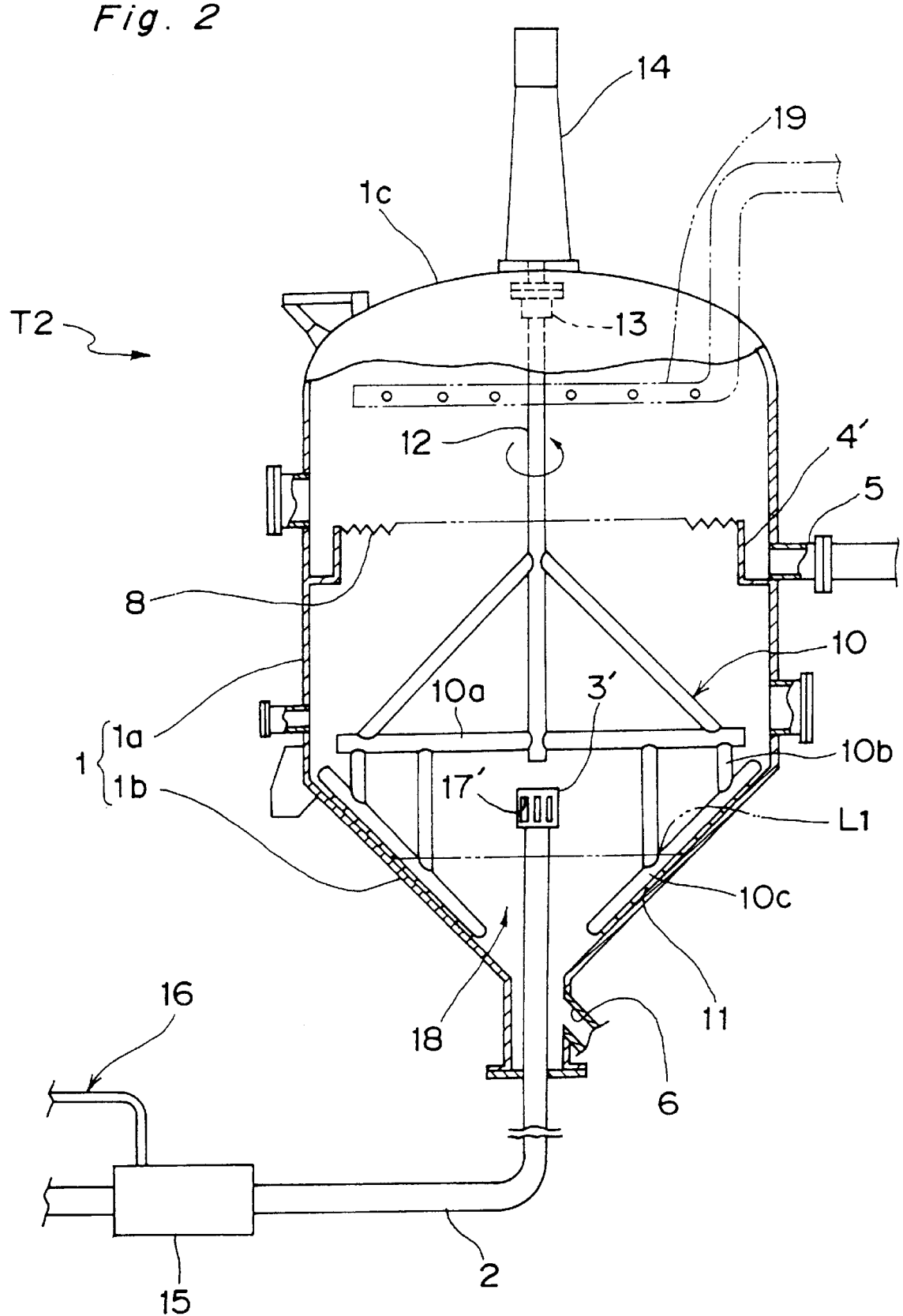
FIG. 2 is a partly broken explanatory elevation view of a thickener of pressurized specification according to the present invention.

FIG. 2 illustrates a thickener of pressurized specification. A separator of the present invention exhibits the same effect whether under normal pressure or elevated pressure. In order to avoid duplication, members common to those in the thickener T1 of normal pressure specification as shown in FIG. 1 are affixed with same symbols, with explanation thereof being omitted, and description is made, focusing only on the difference from the thickener T1 of normal pressure specification.

As shown in FIG. 2, in a pressurized thickener T2, the upper end of the sedimentation tank 1 is closed by a cover member 1$c$ so as to form a sealed structure. The over-flow gutter 4' is installed on the inner peripheral surface of the straight barrel section 1$a$ within the sedimentation tank 1. Accordingly, the thickener T2 can perform solid-liquid separation while holding the inside of the sedimentation tank T2 in the pressurized state.

Furthermore, in such a pressurized thickener T2, since the sedimentation tank 1 is of a sealed construction, clarified liquid can be separated by disposing a ring-shaped clarified liquid discharge passage 19 at an upper part of the sedimentation tank 1 as shown by a chain line, under the condition that the over-flow gutter 4' and the clarified liquid discharge passage 5 are omitted.

Hereinafter, in the case of using such a thickener T1 or T2, a design standard obtained from the experiment and analysis by the inventor of the present invention is described.

Figure 3:
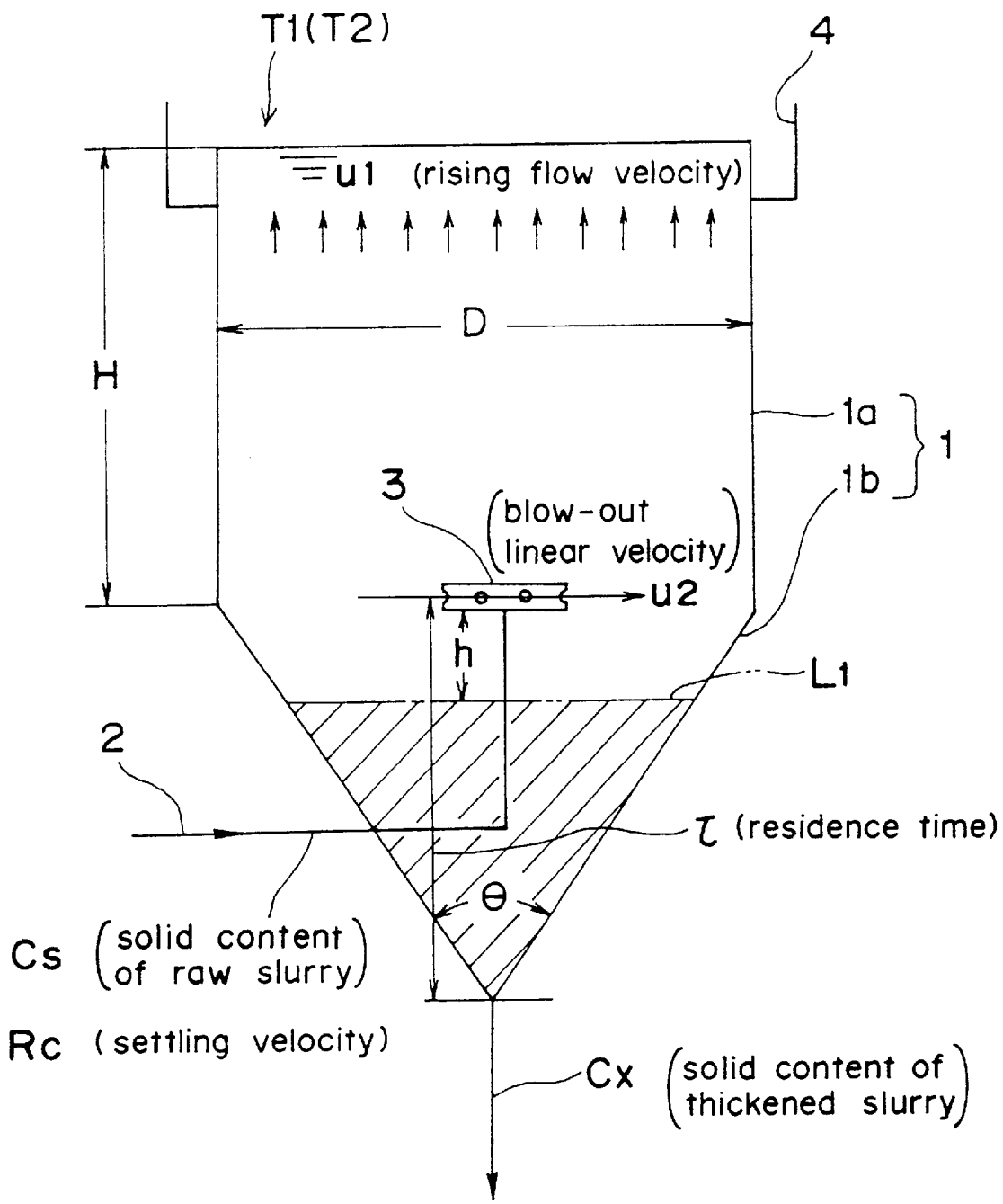
FIG. 3 is a schematic diagram showing the specifications of the basic design for a thickener according to the present invention.

Various parameters according to the present invention are, as shown in FIG. 3, the tank diameter D, the height H of straight barrel section, the apex angle θ, the solid content $C_s$ of slurry, the solid content $C_x$ of thickened slurry (solid content $C_x$ of under-slurry), the rising flow velocity $u_1$ of liquid in the tank, slurry feed linear velocity $u_2$ from the slurry feed member 3, the distance h between the slurry feed member 3 and the boundary face $L_1$ of the thickened slurry zone 18, the residence time t of solid, etc.

It is to be noted here that concrete numeric values vary depending upon kind of slurry involved, solid content of the slurry, flocculant to be employed, solid content of discharged slurry, separation efficiency and so on and not invariant. Therefore, it is recommended to confirm an optimum value through a simple preliminary experiment or the like in designing.

In a sedimentation tank 1 in which the tank diameter D is 1 m, the height H of the straight barrel section is 0.2D to 1.0D, and the apex angle is 60° to 120°, by setting so that the distance h between the slurry feed member 3 and the thickened slurry boundary face $L_1$, is 5 cm to 50 cm (preferably, 10 cm to 30 cm), the feed linear velocity $u_2$ from the slurry feed member 3 is below 50 cm/sec (normally, 10 cm/sec to 50 cm/sec), the rising velocity $u_1$ of liquid in the tank is 10 m/hr to 30 m/hr (preferably, 15 m/hr to 25 m/hr), the slurry having the solid content $C_s$ of 30 g/l to 100 g/l (40 g/l to 60 g/l) and the particle settling velocity (settling velocity of boundary face of flocs formed from slurry having above-mentioned solid content by adding flocculant and agitation) of 15 m/hr to 100 m/hr (40 m/hr to 80 m/hr) can be separated with an operation result that the residence time of slurry fed from the slurry feed member 3 within the sedimentation tank 1 is less than 10 min (preferably, less than 5 min), the thickened slurry solid content $C_x$ from the thickened slurry discharge passage is more than 350 g/l (normally, 400 g/l to 600 g/l) and the separation efficiency is more than 98%.

Furthermore, in the above-mentioned sedimentation tank 1, by setting so that the distance h between the slurry feed member 3 and the thickened slurry layer boundary face $L_1$ is 5 cm to 50 cm (preferably, 10 cm to 30 cm), the feed linear velocity $u_2$ from the slurry feed member 3 is below 50 cm/sec (normally, 10 cm/sec to 50 cm/sec), the rising velocity $u_1$, of liquid in the tank is 3 m/hr to 15 m/hr (preferably, 4 m/hr to 12 m/hr), the slurry having the solid content $C_s$ of 100 g/l to 300 g/l (100 g/l to 150 g/l) and the particle settling velocity of 0.5 m/hr to 15 m/hr (3 m/hr to 15 m/hr) can be separated with an operation result that the residence time within the sedimentation tank 1 of the slurry fed from the slurry feed member 3 is within 10 minutes, the solid content $C_x$, of the thickened slurry from the thickened slurry discharge passage is more than 350 g/l (normally, 400 g/l to 600 g/l), and the separation efficiency is more than 98%.

It is preferable for the condition for adding flocculant into the slurry supply passage to be set as follows. Namely it is preferable for the position into which flocculant is added to be set such a condition that flocculant is mixed with solid in slurry before the slurry is fed from the outlets of the slurry feed member, and the residence time of slurry is long enough for the flocs to be grown up sufficiently. It is more preferable for the position into which the flocculant is added to be set such a condition that the residence time of the slurry is long enough for the growth of the flocs to be substantially completed. And it is preferable for the flow intensity of slurry to be set such a condition that flocs formed in slurry are not destroyed.

Such conditions depend on the character of slurry to be treated (property of the solid, property of the liquid, solid content of the slurry, temperature of the slurry), kind of flocculant, quantity of added flocculant etc, and are not invariant. For example, when slurry including so-called red mud and liquid derived from the manufacturing process of aluminum hydroxide according to Bayer's process, is to be separated, by setting such a condition that the slurry is added with 0.005 wt % to 0.1 wt % flocculant of sodium polyacrylate group as compared with the solid content in the slurry, the flow velocity of the slurry in the slurry supply passage is about 1 m/sec to about 4 m/sec, and the residence time of flocculant from the addition thereof to the feed from the outlets of the slurry feed member is longer than or equal to about 3 seconds (normally, about 5 seconds to about 60 second), the results as follows are obtained. Namely in the case that the slurry temperature is 120° C. to 140° C. and solid content of the slurry is 30 g/l to 100 g/l or less than the above, the settling velocity of the flocs (solid particles) fed from the outlets of the slurry feed member is such high velocity of 15 m/hr to 100 m/hr, further in the case that the slurry temperature is 70° C. to 100° C. and solid content of the slurry is 100 g/l to 300 g/l, the settling velocity of the flocs is such high velocity of 0.5 m/hr to 15 m/hr. Thus extremely rapid solid-liquid separation can be accomplished.

Moreover, if the solid-liquid separator according to the present invention is applied and a flocculant is used therein, for example, in the separation process of the red mud and/or the washing process of the separated red mud on manufacturing of aluminum hydroxide according to Bayer's process, it is preferable that the molecular weight of the flocculant is equal to or greater than 5,000,000. Further judging from the view point of industrial use, in general, it is preferable that the molecular weight is within a range of about 5,000,000 to 30,000,000.

As described above, according to the sedimentation type solid-liquid separator of the present invention, very high solid-liquid separation efficiency is obtained, and the residence time of the solid is extremely shortened, whereby the down-sizing of the separator can be accomplished. Thus the solid-liquid separator of the present invention may be utilized widely as an extremely effective solid-liquid separator, for example, in the red mud separation process for the slurry comprising red mud and sodium aluminate solution (e.g. aqueous solution) derived from the manufacturing process of aluminum hydroxide according to Bayer's process, and/or in the washing process using water for the separated red mud.

Embodiment

Hereinafter, the present invention is described further in detail with respect to an embodiment.

Embodiment 1

By using the sedimentation tank constructed as shown in FIG. 1 (tank diameter D: 100 cm, height H of the straight barrel section: 70 cm, apex angle θ: 60°, distance h between the slurry feed member 3 and the thickened slurry layer boundary face $L_1$: 25 cm, rate of revolution of the rake: 3.6 rpm), 18.4 m³/hr of the slurry derived by the dissolving step of Bayer's process of 80° C. and 50 g/l solid content which was added with 0.015 g/l flocculant of sodium polyacrylate group, was horizontally (in parallel with the thickened slurry zone boundary face $L_1$) fed from the slurry feed member 3 at the slurry feed linear velocity of 23 cm/sec, thickened slurry of 366 g/l solid content was drawn out from the thickened slurry discharge passage, and clarified liquid of 0.14 g/l solid content was discharged from the overflow gutter.

In this experiment, the residence time within the sedimentation tank of the slurry discharged from the slurry feed member 3 was 3 minutes, the upward flow velocity of liquid in the tank and solid settling velocity were 20 m/hr, and the separation efficiency was 99.8%.

Comparison example 1

By using a thickener constructed as shown in FIG. 1, the slurry similar to that used in Embodiment 1 was supplied in the same quantity, at the feed direction of 45° upward with respect to the horizontal direction. At this time, the solid content of the slurry discharged from the thickened slurry discharge passage 6 was 300 g/l, the solid content of the clarified liquid discharged from the overflow gutter was 8 g/l and the solid-liquid separation efficiency was 86%.

Further by using a thickener constructed as shown in FIG. 1, the slurry similar to that used in Embodiment 1 was supplied in the same quantity, at the feed direction of 45° downward with respect to the horizontal direction. At this time, the solid content of the slurry discharged from the thickened slurry discharge passage 6 was 320 g/l, the solid content of the clarified liquid discharged from the overflow gutter was 5 g/l and the solid-liquid separation efficiency was 91%.

Comparison example 2

By using a thickener constructed as shown in FIG. 4, in which the tank diameter D is 100 cm, the height H of the straight barrel section is 70 cm, the apex angle θ is 60°, and a cylindrical feed-well having diameter of 20 cm and height of 30 cm is provided as sedimentation separator (the condition of agitation is similar to Embodiment 1), the slurry similar to that used in Embodiment 1 was supplied in the same quantity into the feed-well.

At this time, the disturbance in the tank was large and the boundary face of the thickened slurry layer could not be confirmed, the solid content of the slurry discharged from the thickened slurry discharge passage was 280 g/l, the solid content of the clarified liquid discharged from the overflow gutter was 19 g/l and the solid-liquid separation efficiency was 71.6%.

Comparison example 3

By using a thickener similar to that used in Comparison example 2 except to have the feed-well height of 50 cm, the slurry similar to that used in Embodiment 1 was supplied in the same quantity. At this time, the solid content of the slurry discharged from the thickened slurry discharge passage was 330 g/l, the solid content of the clarified liquid discharged from the overflow gutter was 3 g/l and the solid-liquid separation efficiency was 95%.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of separating red mud from red mud slurry containing the red mud and sodium aluminate solution derived from a manufacturing process of aluminum hydroxide according to Bayer's process, the method comprising the steps of:

preparing a sedimentation type solid-liquid separator which includes a sedimentation tank having a straight barrel section and an upward-expanding tapered section provided adjacent to the lower end of the straight barrel section, a clarified liquid discharge means disposed in an upper portion of the straight barrel section, a thickened slurry discharge means disposed in a lower portion of the tapered portion, and an agitation means disposed in the sedimentation tank for slowly agitating the thickened slurry so as to expedite the thickening of the thickened slurry and to collect sludge; and feeding the red mud slurry, in which flocs have been formed substantially completely by adding flocculant having molecular weight of not less than 5,000,000 thereto, into the clarified liquid near an upper face of the thickened slurry layer formed in the sedimentation tank in a substantially horizontal direction with a linear velocity in a range of 10 to 50 cm/sec, while causing the flocs to settle substantially freely, and discharging the clarified liquid and the thickened slurry through the clarified liquid discharge means and the thickened slurry discharge means, respectively.

2. The method recited in claim 1, wherein the red mud slurry in which the flocs have been formed is fed in a direction within a range of about 30° upward or downward with respect to a perfectly horizontal direction.

3. The method recited in claim 1, wherein the red mud slurry in which the flocs have been formed is fed radially outward from a center of the sedimentation tank to a periphery of the sedimentation tank, in a substantially horizontal direction.

4. The method recited in claim 1, wherein the red mud slurry in which the flocs have been formed is fed radially inward from a periphery of the sedimentation tank to a center of the sedimentation tank, in a substantially horizontal direction.

5. The method recited in claim 1, wherein the flocs are formed by adding a flocculant into such a position of a passage for supplying the red mud slurry to the sedimentation type solid-liquid separator that residence time of the red mud slurry therein is long enough for a growth of the flocs to be substantially completed.

6. The method recited in claim 5, wherein the flocculant is a high molecular flocculant.

7. The method recited in claim 5, wherein the flocculant is a high molecular flocculant of sodium polyacrylate group.

8. The method recited in claim 5, wherein the residence time is in range of about 5 to 60 seconds.

9. The method recited in claim 1, wherein the flocculant is a high molecular flocculant.

10. The method recited in claim 1, wherein the flocculant is a high molecular flocculant of sodium polyacrylate group.

11. The method recited in claim 1, wherein the ratio H/D of the straight barrel section height H to the straight barrel section diameter D is in a rang of 0.2 to 1.0 and apex angle of the tapered portion is in a range of 60° to 120°, with respect to the sedimentation tank.

12. The method recited in claim 1, wherein the red mud slurry in which the flocs have been formed is fed at a position of 5 to 50 cm above an upper face of the thickened slurry layer formed in the sedimentation tank.

* * * * *